US011615272B2

(12) United States Patent
Memon et al.

(10) Patent No.: US 11,615,272 B2
(45) Date of Patent: Mar. 28, 2023

(54) ANOMALY ANALYSIS USING A BLOCKCHAIN, AND APPLICATIONS THEREOF

(71) Applicant: Capital One Services, LLC, McLean, VA (US)

(72) Inventors: Salim Memon, Richardson, TX (US); Saira Zaman, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 389 days.

(21) Appl. No.: 16/904,189

(22) Filed: Jun. 17, 2020

(65) Prior Publication Data

US 2021/0397891 A1 Dec. 23, 2021

(51) Int. Cl.
*G06K 9/62* (2022.01)
*G06N 20/20* (2019.01)
*H04L 9/06* (2006.01)
*H04L 9/00* (2022.01)

(52) U.S. Cl.
CPC ......... *G06K 9/6257* (2013.01); *G06K 9/6262* (2013.01); *G06N 20/20* (2019.01); *H04L 9/0643* (2013.01); *H04L 9/50* (2022.05)

(58) Field of Classification Search
None
See application file for complete search history.

(56) References Cited

U.S. PATENT DOCUMENTS

2017/0308557 A1* 10/2017 Cassidy ............... G06N 20/00
2018/0018723 A1* 1/2018 Nagla ................... H04L 63/08
2018/0181538 A1* 6/2018 Crabtree ............... H04L 67/10
2018/0253464 A1* 9/2018 Kohli ................ G06F 16/219
2018/0285971 A1* 10/2018 Rosenoer ............. G06N 20/00
(Continued)

FOREIGN PATENT DOCUMENTS

CN 108573388 A 9/2018
IN 201841038695 A 10/2018

OTHER PUBLICATIONS

Nist, blockchain—Glossary _ CSRC (Year: 2022).*
(Continued)

*Primary Examiner* — John W Hayes
*Assistant Examiner* — Dennis G Keritsis
(74) *Attorney, Agent, or Firm* — Sterne, Kessler, Goldstein & Fox P L.L.C.

(57) ABSTRACT

Disclosed herein are system, method, and computer program product embodiments for scrubbing anomalies from an expanding dataset. In an embodiment, a data sanitization system may determine whether data is anomalous to a set of data stored on a first blockchain. The data sanitization system may perform this determination using a first machine learning algorithm trained using the set of data. Upon determining that data is anomalous, the data sanitization system may publish the data in a second blockchain different from the first blockchain. The data sanitization system may monitor data of the second blockchain and apply a second machine learning algorithm to this data to identify a pattern of anomalous data. In response to identifying the pattern, the data sanitization system may publish the anomalous data of the second blockchain to the first blockchain.

20 Claims, 6 Drawing Sheets

(56) References Cited

U.S. PATENT DOCUMENTS

2019/0147468 A1* 5/2019 Elias .................. G06F 7/026
705/7.34
2019/0340533 A1* 11/2019 Copper ................ G06F 16/22

OTHER PUBLICATIONS

Cluster analysis—Why we need training and test datasets in research_—Stack Overflow (Year: 2012).*
Machine learning—Do we need to set training set and testing set for clustering_—Cross Validated (Year: 2017).*
Machine learning—How to split data into training and testing for clustering—Cross Validated (Year: 2018).*
Iryna Sydorenko,, Machine Learning & Training Data_ Sources, Methods, Things to Keep in Mind (Year: 2021).*
Google, Machine Learning Glossary _ Google Developers (Year: 2022).*

* cited by examiner

ANOMALY ANALYSIS USING A BLOCKCHAIN, AND APPLICATIONS THEREOF

BACKGROUND

When large amounts of data are collected, some of the data may deviate from a standard pattern. For example, outlier or anomaly data may represent an error or deviation that may hinder analysis of the data. For example, transaction data representing multiple transactions may be collected and analyzed. An outlier or anomaly may be transaction data having a quantity, price, or price per unit that differs from a pattern formed by the other transaction data. This anomalous data may introduce inaccuracies when attempting to identify patterns in the data. For example, the anomalous data may introduce inaccuracies during training of a machine learning algorithm attempting to identify patterns in the data.

In some cases, however, the anomalous data may form a separate pattern that may be additionally useful for data analysis. Some systems may lose or be unable to track this separate pattern, however, and therefore also introduce additional inaccuracies in training a machine learning algorithm.

Further, the trustworthiness of the data may be questionable. For example, the source of the data may be the reason for the anomalous data. In some cases, data may be altered or experience tampering, which may introduce additional inaccuracies. In view of these issues, data systems may experience difficulty managing anomalous data and training machine learning algorithms especially in view of potentially untrustworthy data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for scrubbing anomalies from an expanding dataset.

In an embodiment, a data sanitization system and/or a data reinsertion system may manage data in expanding data sets. For example, an expanding data set may include data that is collected over time and/or continuously. The data sanitization system and the data reinsertion system may be incorporated into a single system, may include overlapping hardware and/or software, and/or may be separate systems. The data sanitization system may monitor incoming and/or gathered data and determine whether received data is anomalous to data stored on a first blockchain. The data stored on the first blockchain may include "sanitized" data or data previously deemed to be conforming and/or related in a particular manner. For example, the data may be transaction data, which may have been previously reviewed and designated as accurate or correct. Upon confirming this data, the data may be stored on the first blockchain.

The data sanitization system may have trained a first machine learning algorithm using the data stored on the first blockchain. Upon receiving new data, the data sanitization system may apply the first machine learning algorithm to determine whether the new data is anomalous to the data stored on the first blockchain. For example, the data sanitization system may apply a cluster analysis to perform this determination. If the data sanitization system determines that the new data is conforming or not anomalous, the data sanitization system may store the new data on the first blockchain. This storage may represent the expansion of the data set stored on the first blockchain and/or an expansion of the data set designated as being sanitized or conforming.

If the data sanitization system determines that the new data is anomalous, the data sanitization system may store the new data on a second blockchain that differs from the first blockchain. This second blockchain may store anomalous data determined to not be conforming with the data stored on the first blockchain. As will be further explained below, a data reinsertion system may monitor the data stored on the second blockchain to identify a pattern of anomalous data. When this pattern is identified, the data reinsertion system may reinsert the data corresponding to the anomalous pattern into the first blockchain. This reinsertion may indicate that the anomalous data have formed a pattern that may be applicable to an analysis performed on the larger and/or expanded data set.

In some embodiments, after the anomalous data has adjusted to a pattern based on attribution from transaction data, the anomalous data may be moved from the second blockchain or anomalous blockchain to the first blockchain or sanitized blockchain. This data may be reinserted into the first blockchain as another set of reliable data via a machine learning algorithm of the data reinsertion system. This machine learning algorithm may be the second machine learning algorithm.

When data has been added to the first blockchain, either by being designated as conforming and/or by reinsertion by the data reinsertion system, the first machine learning algorithm may be retrained using this updated set of data. In this manner, the determination of conforming and/or anomalous data may evolve as the data set continues to expand.

In some embodiments, a third machine learning algorithm may be trained on the set of data stored in the first blockchain to respond to user queries. For example, the third machine learning algorithm may provide analysis for a user attempting to analyze the sanitized data. In some embodiments, a prediction system may use the third machine learning algorithm. The third machine learning algorithm may be a predictive algorithm which may provide a user a predictive analysis based on parameters entered by a user. In some embodiments, instead of a machine learning algorithm, a user may interact with and/or perform an analysis on the sanitized data using a different data organization algorithm, such as, for example, a filtering of data fields. These parameters may be recognized by the third machine learning algorithm to further anticipate specifications and/or requirements provided by a user and to present a particular dataset engineered towards those specifications.

To illustrate an example embodiment, data sanitization system and/or data reinsertion system analyze data corresponding to transaction data, such as, for example, vehicle transactions. The data sanitization system may receive a first set of data used to train the first machine learning algorithm. This first set of data may be verified vehicle transaction data. The vehicle transaction data may relate to transaction information such as the make and model of a vehicle, the year of the vehicle, the mileage of the vehicle, a geographical location corresponding to the sale, and/or the price of the sale. In some embodiments, the vehicle transaction data may include information related to the parties entering the transaction. For example, the data may indicate a vehicle dealership and/or whether the sale was by the owner of a used vehicle. In some embodiments, the transaction information may indicate a location and a mileage distance from the location which may indicate a distance from a particular location where the sale occurred.

Based on the training of the first machine learning algorithm, the data sanitization system may receive additional transaction data and determine whether the additional transaction data is conforming or is anomalous. For example, upon applying a clustering analysis, the data sanitization system may identify that a particular price and/or mileage corresponding to the new transaction data falls outside of a standardized range of values. In this case, the data sanitization system may identify the new data as anomalous and may publish the new data in the second blockchain. The second blockchain may be dedicated to anomalous data.

The data reinsertion system may monitor the second blockchain and/or apply a second machine learning algorithm to the data of the second blockchain to identify a pattern of anomalous data. For example, if a particular cluster of low-priced transactions are identified as corresponding to a particular zip code, the second machine learning algorithm may identify this pattern upon identifying an amount of data forming the pattern. For example, the amount of data may exceed a particular pattern threshold to be designated as a pattern of anomalous data.

Upon identifying this pattern, the data may be reintroduced from the second blockchain into the first blockchain. This reintroduction may aid in the further identification of patterns for data analysis.

As previously explained, when new data is added to the first blockchain either via the data sanitization system and/or the data reinsertion system, the first machine learning algorithm may be retrained using the new data. This retraining may occur via unsupervised machine learning. In this manner, the first machine learning algorithm may be modified to account for new transaction data from the newly received data and/or from a reinsertion of data previously designated as being anomalous.

Similarly, a prediction system may retrain a third machine learning algorithm using the new set of data stored on the first blockchain to provide predictive analysis for a user. For example, the user may wish to know the average cost for a vehicle given different parameters such as make, model, year, and/or zip code. The prediction system may be able to provide a prediction based on the vehicle transaction data stored in the first blockchain. Further, the prediction system may be able to avoid inaccuracies caused by outlier or anomalous data. Thus, the prediction system, via the use of the data sanitization system and/or the data reinsertion system, may provide a more accurate prediction for the user.

As will be further explained below, the use of the first and second blockchain may aid in preserving confidence in the data being analyzed. For example, due to the immutable nature of a blockchain, the blockchain may prevent retroactive tampering or altering of confirmed data. The immutable transaction data and the decentralized nature of the blockchains may provide confidence and reliability for the data. Further, the machine learning algorithms may provide data cleansing to remove errors and/or skewed metrics that may degrade the accuracy of the data.

In the example of vehicle transactions, this vehicle transaction data may be trusted as verified and accurate. Machine learning algorithms may be trained using this data to provide trusted predictions. Further, as previously explained, this type of training may lead to more accurate results as well as more trusted results.

Computer systems implementing the embodiments described herein may more efficiently process anomalous information. For example, computer systems utilizing these embodiments may separate anomalous information while still focusing on the analysis of conforming data. The computer systems may then avoid the costly computation resources spent when attempting to analyze standardized and anomalous data together.

Various embodiments of these features will now be discussed with respect to the corresponding figures.

Figure 1A:
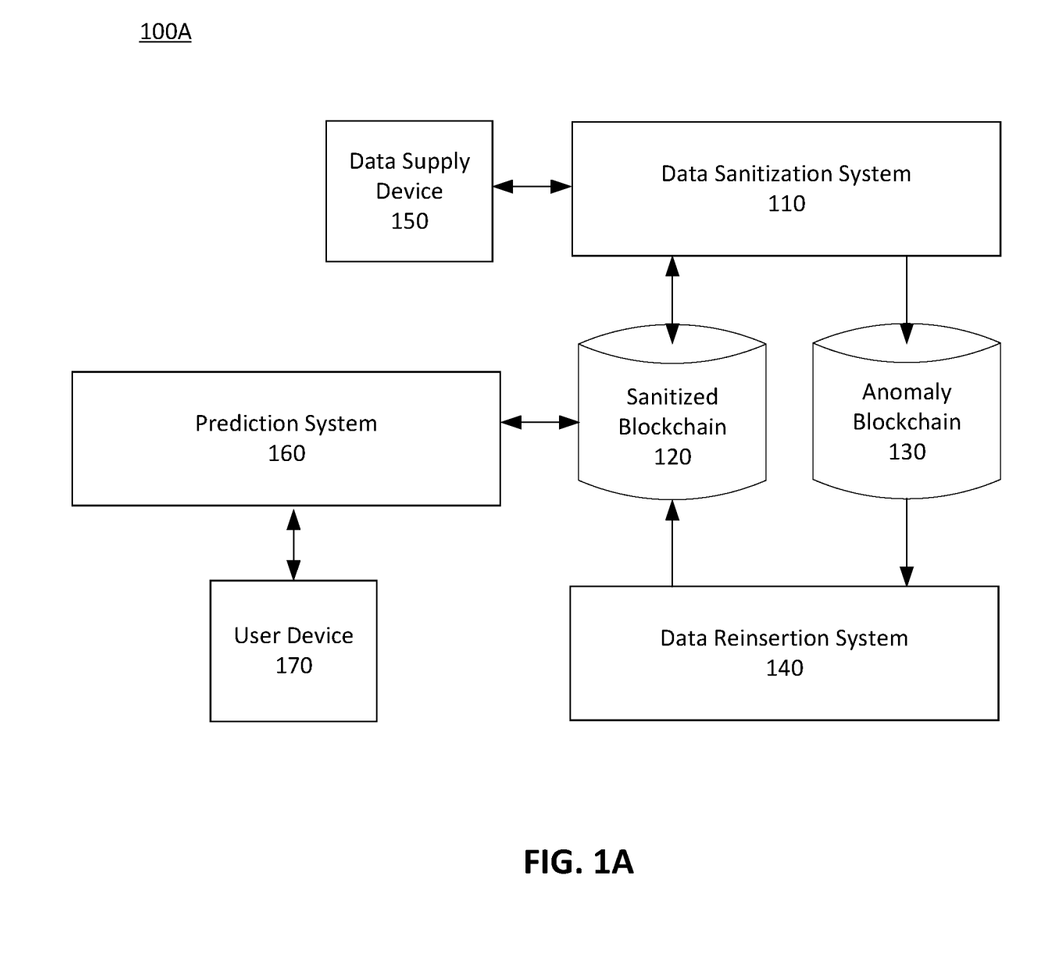
FIG. 1A depicts a block diagram of an environment for managing anomalous data, according to some embodiments.

FIG. 1A depicts a block diagram of an environment 100A for managing anomalous data, according to some embodiments. Environment 100A may include data sanitization system 110, sanitized blockchain 120, anomaly blockchain 130, data reinsertion system 140, data supply device 150, prediction system 160, and/or user device 170. Data sanitization system 110 may manage data in expanding data sets. For example, data sanitization system 110 may monitor incoming and/or gathered data and determine whether to store the data in sanitized blockchain 120 or anomaly blockchain 130. Data sanitization system 110 may receive this data from data supply device 150.

Data sanitization system 110 may determine whether incoming data is anomalous to data stored on sanitized blockchain 120. The data stored on sanitized blockchain 120 may include data previously deemed to be conforming and/or related in a particular manner. For example, the data may be transaction data, which may have been previously reviewed and designated by data sanitization system 110 and/or data supply device 150 as accurate or correct. Upon confirming that incoming data conforms, the incoming data may be stored on sanitized blockchain 120. If data sanitization system 110 determines that the incoming data is anomalous, data sanitization system 110 may store the data in anomaly blockchain 130.

In some embodiments, data supply device 150 may provide seed data to data sanitization system 110. This seed data may be designated by a user and/or administrator as being confirmed and/or relevant to use as training for data sanitization system 110. In some embodiments, data sanitization system 110 may retrieve this seed data from sanitized blockchain 120. For example, data supply device 150 and/or another system may have previously stored the seed data on sanitized blockchain 120. Data sanitization system 110 may then access this data. In some embodiments, the seed data may relate to transaction data. For example, the transaction data may include data related to vehicle transactions. This transaction data may include the make and model of a vehicle, the year of the vehicle, the mileage of the vehicle, a geographical location corresponding to the sale, and/or the price of the sale.

Upon accessing the seed data, data sanitization system 110 may train a machine learning algorithm and/or artificial intelligence model to perform the anomaly detection. This training may be performed in an unsupervised manner. For example, data sanitization system 110 may train a machine learning algorithm applying a cluster analysis. Upon training this machine learning algorithm, data sanitization system 110 may identify subsequent data as either being conforming or anomalous using the cluster analysis. Data sanitization system 110 may store conforming data in sanitized blockchain 120 and/or store anomalous data in anomaly blockchain 130.

Data sanitization system 110 may include one or more processors, memory, servers, routers, modems, circuitry, and/or antennae configured to interface with data supply device 150, sanitized blockchain 120, and/or anomaly blockchain 130. In some embodiments, data supply device 150 may be an electronic communication device, such as a phone, tablet, desktop computer, or laptop computer. A user may use data supply device 150 to interface with and/or manipulate data sanitization system 110. In some embodiments, data sanitization system 110 may be a system providing a separate user interface. In some embodiments, data sanitization system 110 may be a server interfacing with data supply device 150, which may be a client device. For example, data sanitization system 110 may be part of a network including sanitized blockchain 120 and/or anomaly blockchain 130.

In some embodiments, sanitized blockchain 120 may be a distinct blockchain from anomaly blockchain 130. In some embodiments, sanitized blockchain 120 and anomaly blockchain 130 may share a common distributed ledger but may occupy different portions of the distributed ledger. Sanitized blockchain 120 and/or anomaly blockchain 130 may be decentralized. This decentralization may contribute to their secure nature and/or to the authenticity of the data stored on either blockchain. In some embodiments, sanitized blockchain 120 and/or anomaly blockchain 130 may be accessible to multiple systems for verification of data stored by data sanitization system 110. This may operate in a decentralized manner. The data may be transaction data, such as, for example, vehicle transaction data. Using the immutable qualities of a blockchain system, users may rely on the confirmation that the transactions are valid even if some transactions appear as outliers and/or anomalies.

As data supply device 150 continues to supply data to data sanitization system 110, data sanitization system 110 may continue to determine whether each instance of data conforms with the data stored in sanitized blockchain 120 and/or is anomalous. Data sanitization system 110 may apply a machine learning algorithm such as a cluster analysis to perform this determination.

In some embodiments, data sanitization system 110 may retrain the machine learning algorithm based on the data of sanitized blockchain 120. For example, data sanitization system 110 may store additional data in sanitized blockchain 120 and retrain its machine learning algorithm based on the updated dataset stored in sanitized blockchain 120. In this manner, data sanitization system 110 may continuously retrain its machine learning algorithm based on additional data. This retraining may aid in identifying trends based on the data. In some embodiments, the retraining may guard against an incorrect anomaly classification in cases where data is trending in a particular direction. As will be further explained below, data sanitization system 110 may be retrained based on data identified by data reinsertion system 140. Data reinsertion system 140 may reinsert anomalous data from anomaly blockchain 130 to sanitized blockchain 120.

Figure 1B:
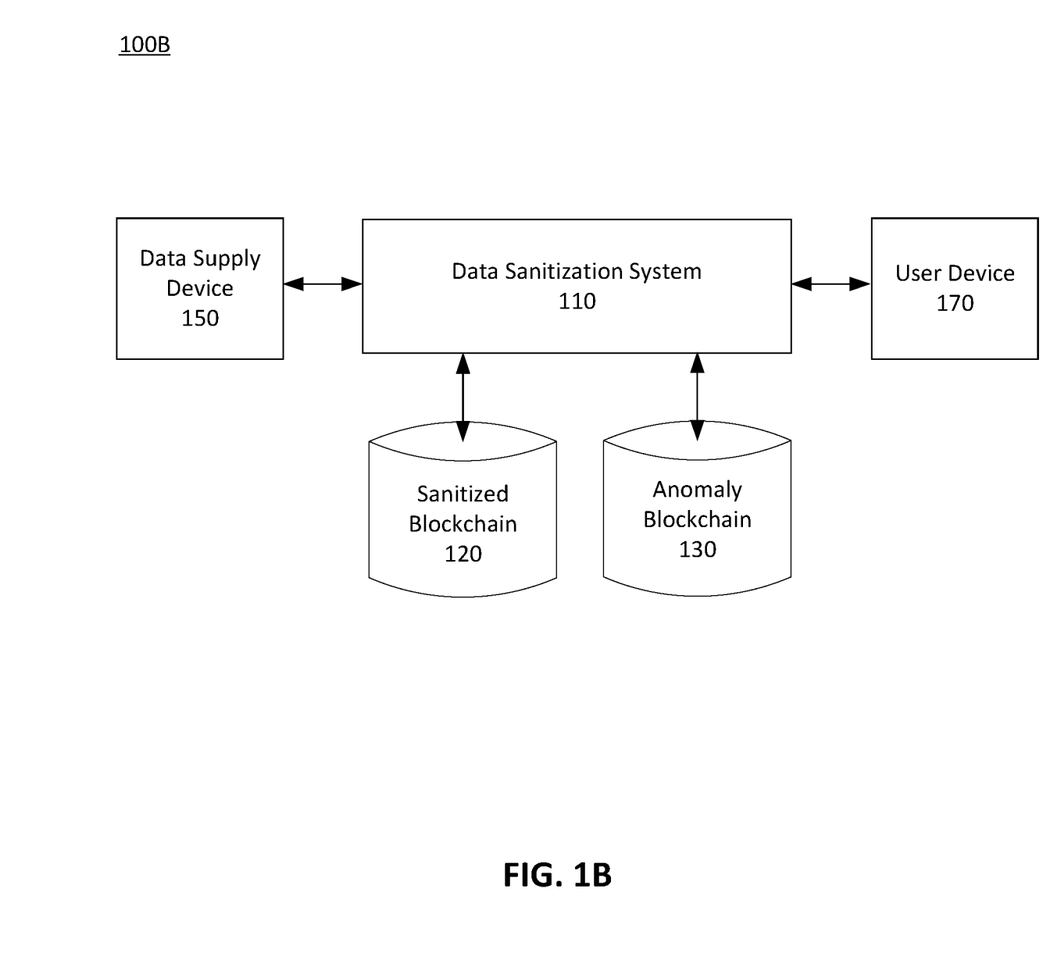
FIG. 1B depicts a block diagram of an environment for managing anomalous data using a data sanitization system, according to some embodiments.

Data reinsertion system 140 may operate as a distinct system from data sanitization system 110 and/or may be integrated into a common system with data sanitization system 110. FIG. 1B depicts an embodiment implementing both systems together. FIG. 1A depicts data reinsertion system 140 as a separate system.

Data reinsertion system 140 may include one or more processors, memory, servers, routers, modems, circuitry, and/or antennae configured to interface with sanitized blockchain 120 and/or anomaly blockchain 130. Data reinsertion system 140 may utilize machine learning algorithms to analyze data stored in anomaly blockchain 130. The analysis may use a reinsertion algorithm to determine whether a pattern exists for the data stored in anomaly blockchain 130. Upon detecting this pattern, data reinsertion system 140 copies the previously designated anomalous data from anomaly blockchain 130 to sanitized blockchain 120. This copy may preserve the data on sanitized blockchain 120 due to the immutable nature of sanitized blockchain 120.

To detect the pattern, data reinsertion system 140 may apply a machine learning algorithm and/or an artificial intelligence model to the data stored in anomaly blockchain 130. In some embodiments, data reinsertion system 140 may perform a pull of data as new instances of data are stored onto anomaly blockchain 130. Data reinsertion system 140 may retrieve this data and store it locally. Data reinsertion system 140 may apply the machine learning algorithm to this data to determine the data is similar enough to form a group indicating a pattern. For example, the data may be analyzed based on a threshold of similarity for one or more parameters of the data. In a cluster analysis, a group of data may be identified and then copied to sanitized blockchain 120.

In some embodiments, the data may relate to transaction data such as vehicle transactions. Anomalous transaction data may have been identified by data sanitization system 110 and stored in anomaly blockchain 130. Data sanitization system 110 may have identified the data as non-conforming with the data stored in sanitized blockchain 120 based on a data sanitization machine learning algorithm. Data sanitization system 110 may have designated the data as an outlier and stored the data in anomaly blockchain 130. In an embodiment where the data is related to vehicle transactions, the outlier data may be, for example, a price or mileage of a vehicle. For example, transaction data having a price outside of a normal range for comparable vehicles based on the conforming data stored in sanitized blockchain 120 may be stored in anomaly blockchain 130.

Data reinsertion system 140 may analyze the anomalous data to determine whether one or more groups may be formed to indicate a pattern. For example, data reinsertion system 140 may identify a lower price occurring for vehicle transactions due to a corresponding higher mileage and/or damage to a vehicle. In this case, data reinsertion system 140 may reinsert the anomalous data into sanitized blockchain 120. In some embodiments, data reinsertion system 140 may reinsert the anomalous data from anomaly blockchain 130 to sanitized blockchain 120 and remove this data from anomaly blockchain 130. This removal may be recorded across different nodes participating in the blockchain and may prevent data that forms a pattern from existing in anomaly blockchain 130. Removing the data may include updating a new block in a blockchain. In this manner, the removal may include (1) the new block being accepted by the nodes of the blockchain; (2) corresponding machine learning algorithms relearning and/or retraining based on the new block; and (3) the history of what data has or has not been removed, added, and/or updated is still preserved. For example, the history may remain as part of the blockchain. In this case, the machine learning algorithm of data sanitization system 110 may ignore past data when re-learning based on the sanitized data. Similarly, data reinsertion system 140 may relearn based on the current anomalous data. For future data identified as an outlier, data reinsertion system 140 may continue to be retrained on the new data to identify other patterns. In some embodiments, if the new anomalous data follows a previously identified pattern, data reinsertion system 140 may also reinsert this data into sanitized blockchain 120.

Data sanitization system 110 may be retrained based on the reinserted data. Similar to the initial training of the machine learning algorithm in data sanitization system 110, the retraining may occur in an unsupervised manner. By retraining the data sanitization system 110 using the previously designated anomalous data, data sanitization system 110 may identify potentially new trends based on an expanding data set. In this manner, data sanitization system 110 may change its machine learning algorithm and the determination of the data to be deemed as anomalous and stored in anomaly blockchain 130.

In some embodiments, retraining of data sanitization system 110 may occur as new data is stored on sanitized blockchain 120. For example, data sanitization system 110 may pull new data as it becomes available. In some embodiments, the retraining may occur periodically with periodic retrievals. Data reinsertion system 140 may be retrained in a similar manner based on anomaly blockchain 130.

Environment 100A may also include prediction system 160 and/or user device 170. Prediction system 160 may be a separate system from data sanitization system 110 and/or data reinsertion system 140. In some embodiments, prediction system 160 may be implemented using common circuitry, hardware, and/or software as data sanitization system 110 and/or data reinsertion system 140. As will be further described with reference to FIG. 1B, prediction system 160 and data reinsertion system 140 may be implemented using data sanitization system 110.

Prediction system 160 may interface with user device 170 to provide an analysis and/or data corresponding to sanitized blockchain 120. Prediction system 160 may use a machine learning algorithm and/or artificial intelligence to detect trends and/or patterns of data stored in sanitized blockchain 120. Prediction system 160 may identify these trends and/or patterns to user device 170. User device 170 may be an electronic communication device, such as a phone, tablet, desktop computer, or laptop computer.

User device 170 may include a graphical user interface (GUI) allowing a user to interact with prediction system 160. In some embodiments, prediction system 160 may have a server relationship with user device 170, which may be a client device. User device 170 may request information related to the patterns identified by prediction system 160. User device 170 may transmit parameters related to the patterns so that prediction system 160 may identify a pattern. For example, use device 170 may input a particular car's make, model, and year and request information related to a possible price. Prediction system 160 may return a predicted price and/or range of prices based on an analysis of the data in sanitized blockchain 120.

In some embodiments, prediction system 160 may return a fact sheet corresponding to one or more vehicles. For example, the fact sheet may include data related to a vehicle's age and/or cost. In some embodiments, prediction system 160 may provide a vehicle suggestion based on parameters provided by a user. The users and/or car dealerships may be able to trust data and/or predictions provided by prediction system 160 based on the transaction data stored in sanitized blockchain 120 being actual transaction data. Further, the immutability of sanitized blockchain 120 may provide confidence that the transaction data has resisted tampering.

In this manner, prediction system 160 may provide a prediction based on conforming data with outlier data being separate. The separation of the outlier data may aid in producing more accurate results. The reinsertion of this outlier data, however, may further account for other patterns which may be relevant. Similar to data sanitization system 110, prediction system 160 may retrain its machine learning algorithm as new data becomes available in sanitized blockchain 120.

In some embodiments, data sanitization system 110 and/or data reinsertion system 140 may track and/or monitor anomalous data for user inspection. For example, a user accessing data sanitization system 110 and/or data reinsertion system 140 may analyze the data stored in anomaly blockchain 130. The user may then determine if these anomalies present an issue related to the supplied data. In some embodiments, to aid in this analysis, once a threshold amount of pattern data has been identified in anomaly blockchain 130 for reinsertion, this data may be recorded for review by an administrator or operator maintaining the data sanitization system 110 and/or data reinsertion system 140.

In an example embodiment, vehicle information may be stored in sanitized blockchain 120. This vehicle information may relate to transactions related to vehicles sold at different car dealerships. This information may be received from multiple data supply devices 150. In some cases, the mileage reported may be zero or a single digit number for a used car. In this case, the transaction data may be stored in anomaly blockchain 130 as data not conforming to data on sanitized blockchain 120. Data sanitization system 110 may also provide a record of this anomaly. Using this record, data sanitization system 110, data reinsertion system 140, and/or a user accessing these systems may identify the anomaly as originating from a single source. For example, this single source may be a particular data supply device 150 that is providing unreliable data. Other data supply devices 150, however, may produce conforming data. In this case, the user may act to remedy issues with the particular data supply device 150.

In the scenario where multiple instances of anomalous data are identified and surpass a threshold, data reinsertion system 140 may identify the pattern and insert the data back into sanitized blockchain 120. This reinsertion, however, may be erroneous due to the unreliable data given by data supply device 150 even if it forms its own pattern. In this manner, data reinsertion system 140 may store this patterned data on sanitized blockchain 120 erroneously. Data sanitization system 110 may then be trained on unreliable data that should not be used for training. To guard against this case, data reinsertion system 140 may identify a record of data to be reinserted. This record may then be reviewed at a later time and the unreliable data may possibly be removed from sanitized blockchain 120. This removal may occur in the manner previously described. This removal may trigger data sanitization system 110 to retrain its machine learning algorithm based on the updated data in sanitized blockchain 120. This retraining may also train data sanitization system 110 to identify anomalous data and prevent the storage of this data on sanitized blockchain 120.

FIG. 1B depicts a block diagram of an environment 100B for managing anomalous data using a data sanitization system 110, according to some embodiments. As described above, environment 100B depicts data sanitization system 110 which may incorporate the elements of data sanitization system 110, data reinsertion system 140, and/or prediction system 160 into a common system. For example, as described with reference to environment 100B, data sanitization system 110 may perform the functions of data sanitization system 110, data reinsertion system 140, and/or prediction system 160.

Similar to environment 100A, data sanitization system 110 may include one or more processors, memory, servers, routers, modems, circuitry, and/or antennae configured to interface with data supply device 150, sanitized blockchain 120, anomaly blockchain 130, and/or user device 170. In some embodiments, data supply device 150 may be the same system as user device 170. Data sanitization system 110 may be implemented using circuitry, hardware, and/or software configured to apply the machine learning algorithms described with reference to environment 100A. In some embodiments, data sanitization system 110, data reinsertion system 140, and/or prediction system 160 may be cloud-based systems. In this manner, data sanitization system 110 may analyze incoming data, determine whether to store the data in sanitization blockchain 120 or anomaly blockchain 130, perform a reinsertion analysis, and/or perform a prediction analysis. Data sanitization system 110 may also retrain a machine learning algorithm in a manner similar to the ones described with reference to environment 100A.

In some embodiments, data sanitization system 110 may utilize a machine learning algorithm to perform the operations described with reference to environment 100A. For example, this machine learning algorithm may be an end-to-end artificial intelligence. In some embodiments, data sanitization system 110 may use multiple machine learning models and/or subsystems to perform the functions described with reference to environment 100A.

Figure 2:
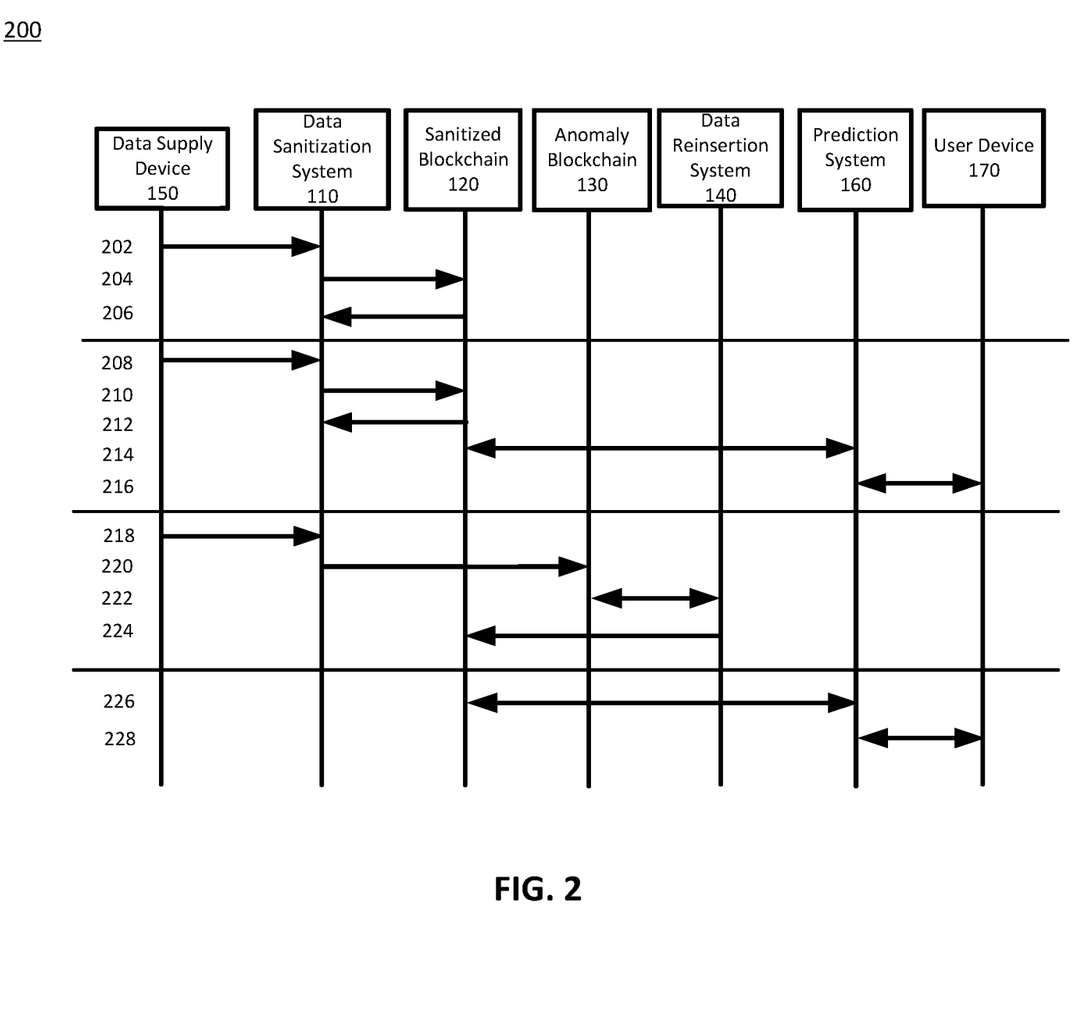
FIG. 2 depicts a flow diagram illustrating a method for system communications for managing anomalous data, according to some embodiments.

FIG. 2 depicts a flow diagram illustrating a method 200 for system communications for managing anomalous data, according to some embodiments. Method 200 may utilize the elements described with reference to FIG. 1A and/or FIG. 1B. For example, method 200 depicts an example embodiment for data communications between systems including data supply device 150, data sanitization system 110, sanitized blockchain 120, anomaly blockchain 130, data reinsertion system 140, prediction system 160, and/or user device 170. These may be distinct systems as described with reference to FIG. 1A. The data sanitization system 110 as described with reference to FIG. 1B may also implement method 200. In this case, data sanitization system 110 may additionally perform the functions of data reinsertion system 140 and/or prediction system 160.

It is to be appreciated that not all steps may be needed to perform the disclosure provided herein. Further, some of the steps may be performed simultaneously, or in a different order than shown in FIG. 2, as will be understood by a person of ordinary skill in the art.

At 202, 204, and 206, data supply device 150 may provide seed data to data sanitization system 110 to store on sanitized blockchain 120 and/or to train a machine learning algorithm of data sanitization system 110. At 202, data supply device 150 may transmit the seed data to data sanitization system 110. At 204, data sanitization system 110 may store and/or publish this data on sanitized blockchain 120. At 206, data sanitization system 110 may train a machine learning algorithm based on the data stored in sanitized blockchain 120. In some embodiments, other data may have been originally stored in sanitized blockchain 120. At 206, data sanitization system 110 may train a machine learning algorithm using this already stored data as well as the data provided by data supply device 150. In some embodiments, data sanitization system 110 may train its machine learning algorithm prior to storing the data on sanitized blockchain 120.

At 208, data supply device 150 may provide data to data sanitization system 110. This data may be new and/or incoming data to be sorted based on the training of data sanitization system 110. This data may be, for example, the same type of data as the seed data provided in 202. For example, the data may be transactional data. At 210, the machine learning algorithm of data sanitization system 110 may determine that the data is non-anomalous and may store and/or publish the data on sanitized blockchain 120. At 212, data sanitization system 110 may retrain its machine learning algorithm based on the updated data set stored in sanitized blockchain 120.

At 214, prediction system 160 may identify data stored in sanitized blockchain 120 and/or retrain its own machine learning algorithm. As previously explained, prediction system 160 may identify the new data as stored by data sanitization system 110. At 216, prediction system 160 may provide a prediction, pattern identification, and/or trend analysis to user device 170. In some embodiments, user device 170 may issue a request to identify this data. For example, user device 170 may provide parameters for the prediction system 160 to return corresponding values.

At 218, data supply device 150 may provide second data, which may differ from the data provided at 208. At 220, the machine learning algorithm of data sanitization system 110 may identify this second data as being anomalous. Data sanitization system 110 may then store and/or publish this data in anomaly blockchain 130. At 222, data reinsertion system 140 may analyze anomaly blockchain 130 to determine whether any patterns exist. For example, data reinsertion system 140 may apply a machine learning algorithm such as a clustering analysis to try to identify potential patterns. If data reinsertion system 140 identifies a pattern within anomaly blockchain 130, at 224, data reinsertion system 140 may copy this data to sanitized blockchain 120. In this manner, data reinsertion system 140 may reinsert the previously identified anomalous data into sanitized blockchain 120. Data reinsertion system 140 may publish the anomalous data corresponding to the identified pattern to sanitized blockchain 120.

At 226, prediction system 160 may retrain its machine learning algorithm based on the data in sanitized blockchain 120. This data may include the reinsert data identified by data reinsertion system 140. At 228, prediction system 160 may provide an analysis, trend, and/or pattern data to user device 170 similar to 216.

Figure 3:
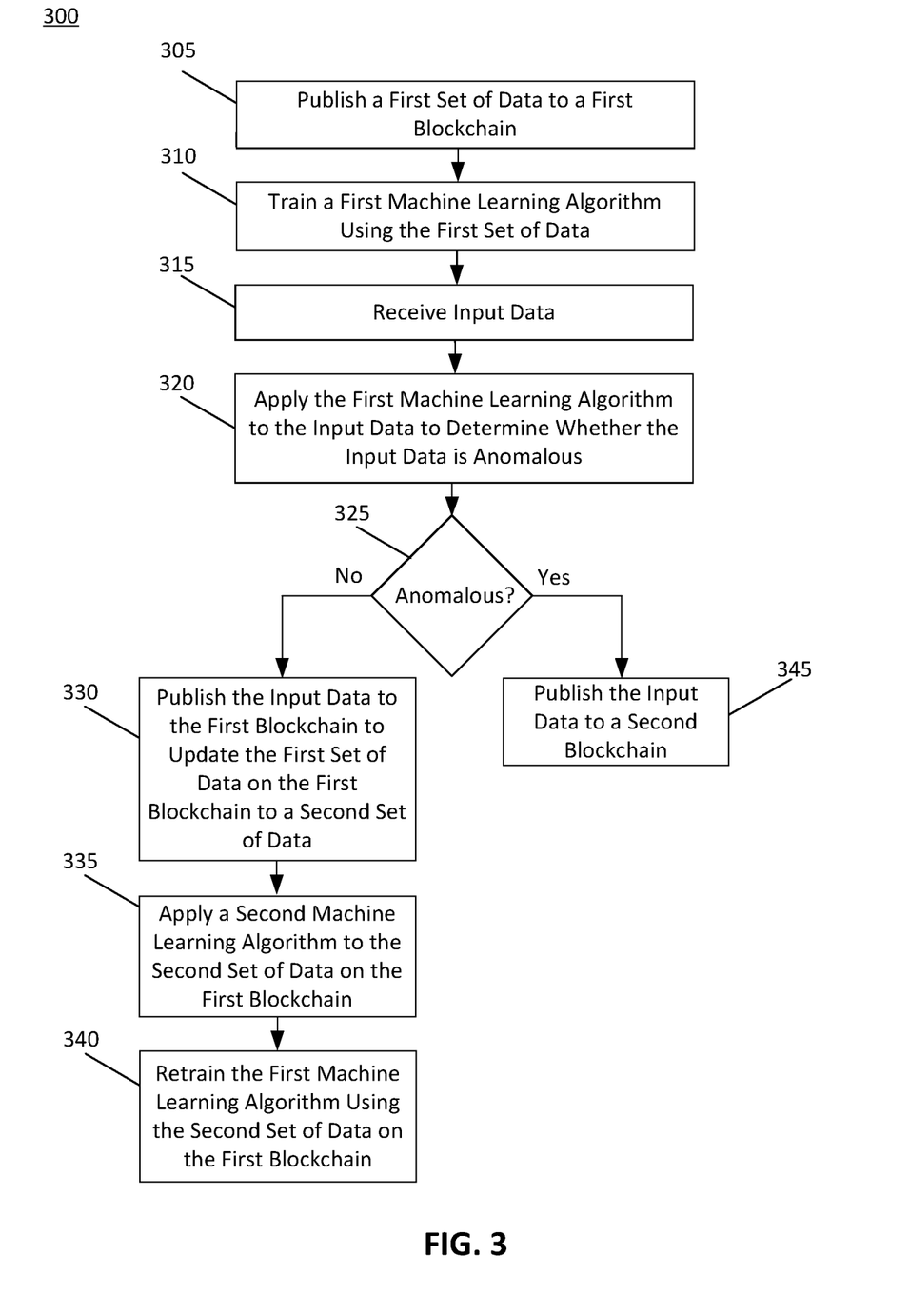
FIG. 3 depicts a flow diagram illustrating a method for identifying anomalous data, according to some embodiments.

FIG. 3 depicts a flow diagram illustrating a method 300 for identifying anomalous data, according to some embodiments. Method 300 shall be described with reference to FIG. 1A and/or FIG. 1B; however, method 300 is not limited to that example embodiment.

In some embodiments, data sanitization system 110 from FIG. 1A and/or FIG. 1B may utilize method 300 to identify anomalous data according to some embodiments. Method 300 may be used to scrub anomalies from an expanding dataset. While method 300 is described with reference to data sanitization system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, data sanitization system 110 may publish a first set of data to a first blockchain. The first blockchain may be, for example, sanitized blockchain 120. The first set of data may be seed data. Data supply device 150 may provide this first set of data to data sanitization system 110. Data sanitization system 110 may determine that this data is confirmed as being data to use as training data. This first set of data may be transaction data. In some embodiments, the transaction data may relate to vehicle transactions.

At 310, data sanitization system 110 may train a first machine learning algorithm using the first set of data. This training may occur in an unsupervised manner. The first machine learning algorithm may include a cluster analysis and/or may include an artificial intelligence model. Data sanitization system 110 may perform this training when it receives the first set of data. In some embodiments, data sanitization system 110 may perform this training based on a retrieval of the data stored in sanitized blockchain 120.

In some embodiments, a machine learning algorithm may be a mathematical model based on sample data. The mathematical model may be trained using a sample set of data. The model may be used to make predictions and/or decisions without being explicitly programmed to perform a task. A machine learning algorithm may be trained using supervised learning, unsupervised learning, and/or semi-supervised learning. As explained above, the first machine learning algorithm may be trained in an unsupervised manner. For example, input data may not be labeled. The model may be prepared by deducing structures present in the training data. For example, the model may extract general rules to reduce redundancy and/or organize data by similarity.

The training may include clustering, dimensionality reduction, and/or association rule learning. The algorithm may also use an Apriori algorithm and/or a K-Means algorithm. Other machine learning algorithms may also be used, such as, for example, a regression algorithm, an instance-based algorithm, a regularization algorithm, a decision tree algorithm, a Bayesian algorithm, a clustering algorithm, an association rule learning algorithm, a neural network, a deep learning algorithm, a dimensionality reduction algorithm, an ensemble algorithm, and/or other machine learning or artificial intelligence models. These algorithms may be used separately and/or in combination.

At 315, data sanitization system 110 may receive input data. This input data may be received from data supply device 150. The input data may be of the same type as the first set of data. For example, the input data and the first set of data may be transaction data which may relate to vehicle transactions.

At 320, data sanitization system 110 may apply the first machine learning algorithm to the input data to determine whether the input data is anomalous. In some embodiments, applying the first machine learning algorithm may include applying a clustering technique to the input data. The clustering may have been trained based on the first set of data. At 325, data sanitization system 110 may determine whether the input data is anomalous. This determination may be performed by identifying whether the input data is outside of a cluster determined from the first set of data. Being outside of the cluster may indicate that the data is non-conforming to the data stored in sanitized blockchain 120.

Figure 4:
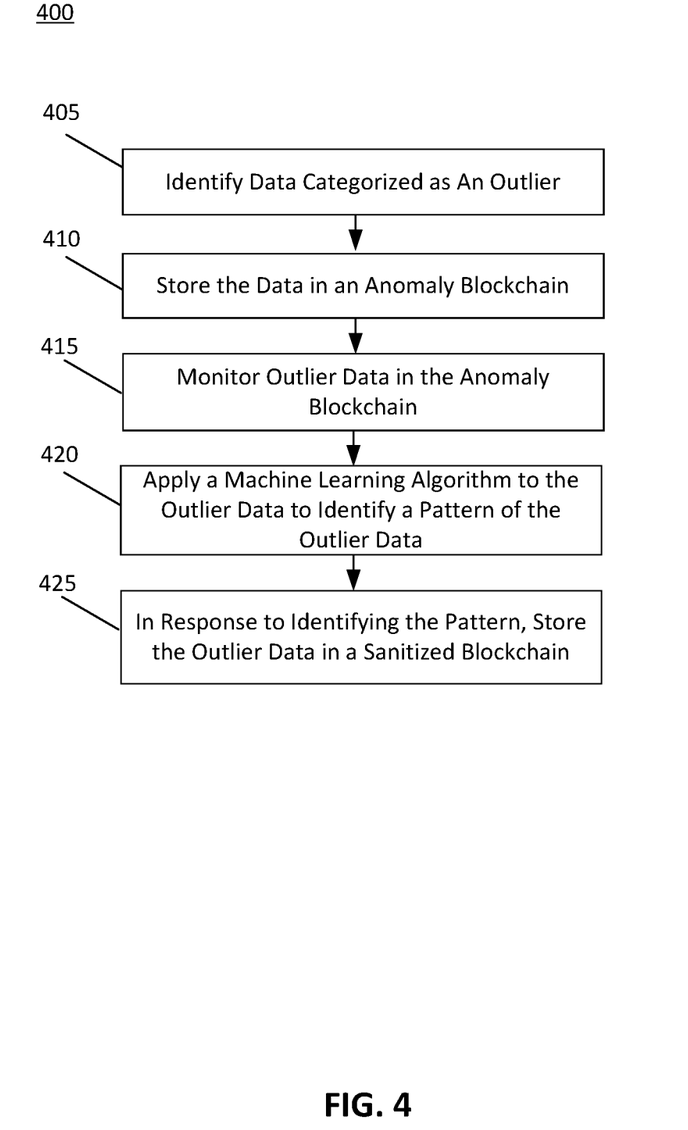
FIG. 4 depicts a flow diagram illustrating a method for reinserting anomalous data, according to some embodiments.

If the input data is determined to be anomalous, data sanitization system 110 may publish the input data to a second blockchain at 345. The second blockchain may be anomaly blockchain 130. FIG. 4 provides additional details regarding an example embodiment of analyzing the second blockchain.

If the input data is determined to be non-anomalous and/or conforming with the data from the first blockchain, at 330, data sanitization system 110 may publish the input data to the first blockchain to update the first set of data on the first blockchain to a second set of data. This second set of data may be an updated set of data. The second set of data may include the first set of data as well as the input data. Storing the input data in the first blockchain and/or sanitized blockchain may aid in the processing of conforming data while separating outlier data.

The first and/or second blockchain may be a formation where blocks of data are linked via a cryptographic hash of a previous block combined with a new hash to represent the hash value of the present block. This hashing may generate the chain and the immutability of the blockchain. The blockchain may be a distributed ledger that may record transactions between parties in a verifiable and permanent manner. Publishing transaction data to the first and/or second blockchain may include writing the transaction to a distributed ledger. In some embodiments, the publishing may include a confirmation and/or validation of a block that is added to the blockchain. Verification of the distributed ledger by multiple entities maintains the credibility of the data being added.

In some embodiments, blockchain networks may be identified by a permission model which dictates entities allowed to maintain blocks and/or publish blocks to a blockchain. In some embodiments, data sanitization system 110 may publish a block to a blockchain directly. In some embodiments, data sanitization system 110 may utilize a separate system having permissions to publish blocks. For example, in the permissioned case, an organization, individuals, and/or group of organizations may be allowed to publish blocks. The addition of a block by a given entity in any of the aforementioned blockchains will be verified by other entities to establish credibility of a transaction that has occurred. Because other entities and/or users may utilize data via prediction system 160, the authenticity of the data provided must be unquestionable.

At 335, data sanitization system 110 may apply a second machine learning algorithm to the second set of data on the first blockchain. This second machine learning algorithm may be the one used by prediction system 160. In some embodiments, prediction system 160 may be implemented using data sanitization system 110 and/or may be a separate system from data sanitization system 110. The second machine learning algorithm may be used to identify patterns related to the second set of data. In some embodiments, the second machine learning algorithm may be used when data sanitization system 110 receives a request from a user device. The request may include a parameter value corresponding to a field of the second set of data. The second machine learning algorithm may then be used to return to the user device data from the second set of data corresponding to the parameter value. For example, the parameter value may be a range of mileages and/or prices and corresponding transaction data may be returned.

At 340, data sanitization system 110 may retrain the first machine learning algorithm using the second set of data on the first blockchain. This retraining may be performed in an unsupervised manner. Data sanitization system 110 may retrain the first machine learning algorithm based on the updated set of data to identify potentially new trends with the data. Retraining the first machine learning algorithm may alter the determination whether new input data is anomalous. As previously described and further described with reference to FIG. 4, the first machine learning algorithm may also be retrained using reinserted data identified by data reinsertion system 140. For example, data reinsertion system 140 may identify a pattern of data from the second blockchain and reinsert this data in the first blockchain. The first machine learning algorithm may be retrained based on the reinsert data and/or the second set of data.

FIG. 4 depicts a flow diagram illustrating a method 400 for reinserting anomalous data, according to some embodiments. Method 400 shall be described with reference to FIG. 1A, FIG. 1B, and/or FIG. 3; however, method 400 is not limited to that example embodiment.

In some embodiments, data sanitization system 110 from FIG. 1A and/or FIG. 1B may utilize method 400 to reinsert anomalous data according to some embodiments. For example, the reinsertion may copy data from anomaly blockchain 130 to sanitized blockchain 120. Method 400 may be used to reinsert anomalies from an expanding dataset. While method 400 is described with reference to data sanitization system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, data sanitization system 110 may identify data categorized as an outlier. This outlier determination may be similar to the designation that input data is anomalous as described with reference to 320 and 325. At 410, data sanitization system 110 may store the data in an anomaly blockchain 130. This storage may be similar to 345 describing the publishing of input data identified as anomalous in a second blockchain.

At 415, data sanitization system 110 may monitor outlier data in the anomaly blockchain. In some embodiments, this monitoring may occur in a manner similar to the previous description of the operation of data reinsertion system 140. For example, data sanitization system 110 may perform the monitoring as described with reference to FIG. 1B. Data sanitization system 110 and/or a separate data reinsertion system 140 may retrieve data from the anomaly blockchain to monitor the data.

At 420, data sanitization system 110 and/or data reinsertion system 140 may apply a machine learning algorithm to the outlier data to identify a pattern of the outlier data. For example, a clustering analysis may be applied to determine whether the outlier data forms a grouped pattern. At 425, in response to identifying the pattern, data sanitization system 110 and/or data reinsertion system 140 may store the outlier data in a sanitized blockchain 120. The outlier data may be published to sanitized blockchain 120. As described with reference to FIG. 3, data sanitization system 110 and/or data reinsertion system 140 may copy the outlier data from the second blockchain to the first blockchain. In this manner, in response to identifying the pattern of anomalous data, data sanitization system 110 and/or data reinsertion system 140 may publish the anomalous data of the second blockchain to the first blockchain.

Data sanitization system 110 may perform the elements of method 300 and method 400 iteratively as new data is identified and/or input. In this manner, data sanitization system 110 may analyze new input to determine whether the input data is anomalous relative to a set of data used to train the first machine learning algorithm, wherein the set of data is published on a first blockchain. Data sanitization system 110 may perform this determination using a first machine learning algorithm. When the data is determined to be anomalous relative to the set of data, data sanitization system 110 may publish the data to a second blockchain different from the first blockchain. Data sanitization system 110 may monitor the data of the second blockchain and apply a second machine learning algorithm to the data of the second blockchain to identify a pattern of anomalous data. In response to identifying the pattern, data sanitization system 110 may publish the anomalous data of the second blockchain to the first blockchain.

Figure 5:
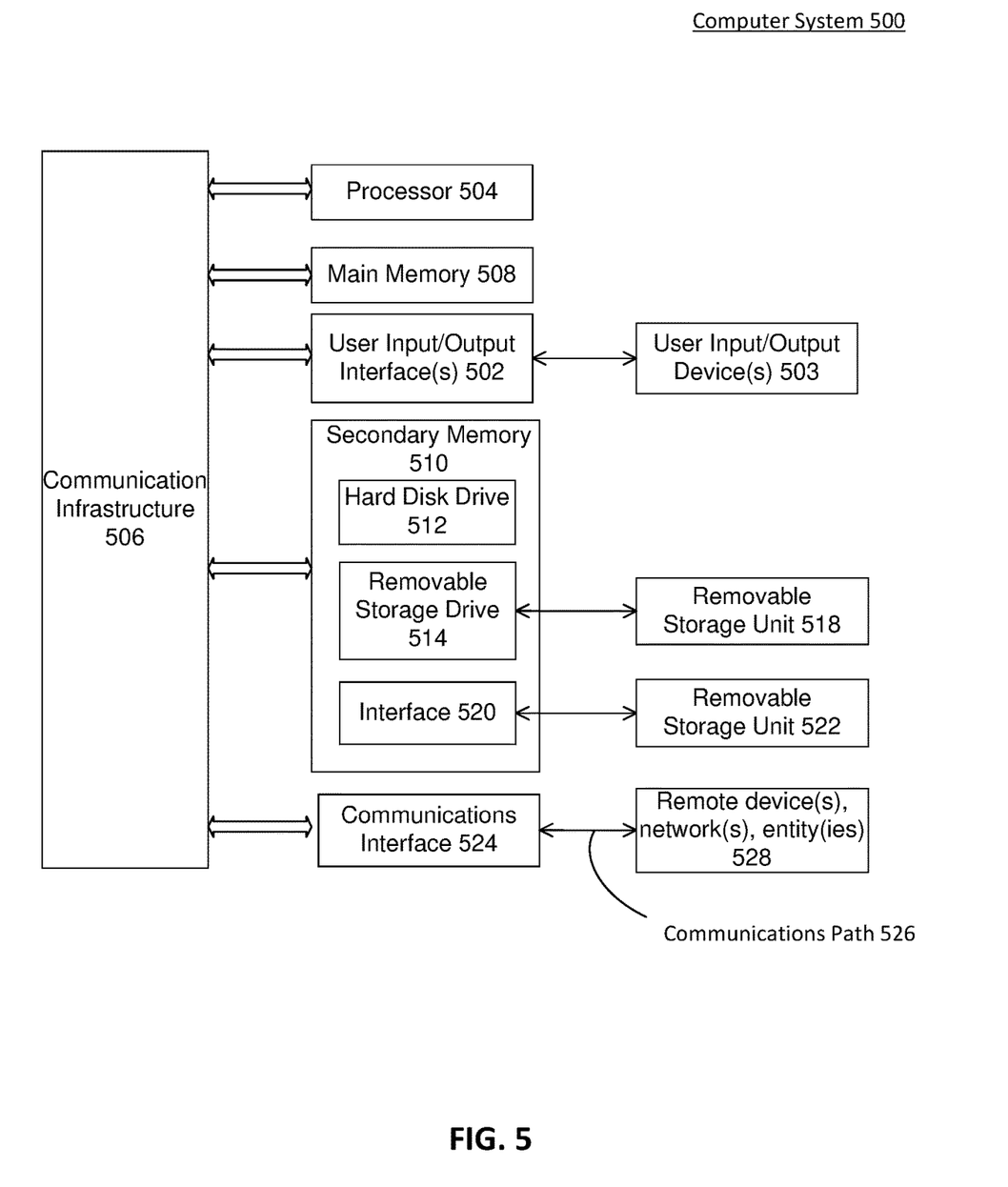
FIG. 5 depicts an example computer system useful for implementing various embodiments.

FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/or any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for scrubbing anomalies from an expanding dataset, comprising:
    receiving data;
    applying a first machine learning algorithm to the data to determine whether the data is anomalous relative to a set of data used to train the first machine learning algorithm, wherein the set of data is published on a first blockchain, and wherein the first machine learning algorithm is supervised or semi-supervised;
    when the data is determined to be anomalous relative to the set of data, publishing the data to a second blockchain different from the first blockchain;
    monitoring data of the second blockchain;

applying a second machine learning algorithm to the data of the second blockchain to identify a pattern of anomalous data; and in response to identifying the pattern, publishing the anomalous data of the second blockchain to the first blockchain.

2. The computer-implemented method of claim 1, further comprising:

receiving second data;

applying the first machine learning algorithm to the second data;

identifying the second data as conforming with the set of data used to train the first machine learning algorithm;

publishing the second data to the first blockchain to generate an updated set of data; and retraining the first machine learning algorithm using the updated set of data.

3. The computer-implemented method of claim 2, wherein the retraining occurs using an unsupervised learning technique.

4. The computer-implemented method of claim 1, wherein the first machine learning algorithm is semi-supervised and wherein applying the first machine learning algorithm further comprises:

applying a clustering technique to the data and the set of data; and determining the data to be anomalous by identifying the data as being outside of a cluster determined from the set of data.

5. The computer-implemented method of claim 1, further comprising:

receiving, from a user device, a request including a parameter value corresponding to a field of the set of data; and returning, to the user device, data from the set of data corresponding to the parameter value from the first blockchain.

6. The computer-implemented method of claim 1, wherein the set of data includes transaction data.

7. The computer-implemented method of claim 6, wherein the set of data includes transaction data related to vehicle transactions.

8. A system for scrubbing anomalies from an expanding dataset, comprising:

a memory; and at least one processor coupled to the memory and configured to:

publish a set of data to a first blockchain;

apply a first machine learning algorithm to transaction data to determine whether the transaction data is anomalous relative to the set of data used to train the first machine learning algorithm, wherein the first machine learning algorithm is supervised or semi-supervised;

when the transaction data is determined to be anomalous relative to the set of data, publish the transaction data to a second blockchain different from the first blockchain;

monitor data of the second blockchain;

apply a second machine learning algorithm to the data of the second blockchain to identify a pattern of anomalous data; and in response to identifying the pattern, publish the anomalous data of the second blockchain to the first blockchain.

9. The system of claim 8, wherein the at least one processor is further configured to:

receive second transaction data;

apply the first machine learning algorithm to the second transaction data;

identify the second transaction data as conforming with the set of data used to train the first machine learning algorithm;

publish the second transaction data to the first blockchain to generate an updated set of data; and retrain the first machine learning algorithm using the updated set of data.

10. The system of claim 9, wherein the retraining occurs using an unsupervised learning technique.

11. The system of claim 8, wherein the first machine learning algorithm is semi-supervised and wherein to apply the first machine learning algorithm, the at least one processor is further configured to:

apply a clustering technique to the transaction data and the set of data; and determine the transaction data to be anomalous by identifying the transaction data as being outside of a cluster determined from the set of data.

12. The system of claim 8, wherein the at least one processor is further configured to:

receive, from a user device, a request including a parameter value corresponding to a field of the set of data; and return, to the user device, transaction data from the set of data corresponding to the parameter value from the first blockchain.

13. The system of claim 8, wherein the set of data includes transaction data related to vehicle transactions.

14. The system of claim 13, wherein the transaction data related to vehicle transaction includes data related to vehicle mileage.

15. A non-transitory computer-readable device having instructions stored thereon that, when executed by at least one computing device, cause the at least one computing device to perform operations comprising:

training a first machine learning algorithm using a set of data published on a first blockchain, wherein the first machine learning algorithm is supervised or semi-supervised;

applying the first machine learning algorithm to data to determine whether the data is anomalous based on a cluster analysis;

when the data is determined to be anomalous relative to the set of data, publishing the data to a second blockchain different from the first blockchain;

monitoring data of the second blockchain;

applying a second machine learning algorithm to the data of the second blockchain to identify a pattern of anomalous data; and in response to identifying the pattern, publishing the anomalous data of the second blockchain to the first blockchain.

16. The non-transitory computer-readable device of claim 15, the operations further comprising:

receiving second data;

applying the first machine learning algorithm to the second data;

identifying the second data as conforming with the set of data used to train the first machine learning algorithm;

publishing the second data to the first blockchain to generate an updated set of data; and retraining the first machine learning algorithm using the updated set of data.

17. The non-transitory computer-readable device of claim 16, wherein the retraining occurs using an unsupervised learning technique.

18. The non-transitory computer-readable device of claim 15, wherein the first machine learning algorithm is semi-supervised and wherein to apply the first machine learning algorithm, the operations further comprise:
  applying a clustering technique to the data and the set of data; and
  determining the data to be anomalous by identifying the data as being outside of a cluster determined from the set of data.

19. The non-transitory computer-readable device of claim 15, the operations further comprising:
  receiving, from a user device, a request including a parameter value corresponding to a field of the set of data; and
  returning, to the user device, data from the set of data corresponding to the parameter value from the first blockchain.

20. The non-transitory computer-readable device of claim 15, wherein the set of data includes data related to vehicle transactions.

\* \* \* \* \*